(12) United States Patent
Bienas et al.

(10) Patent No.: US 8,010,093 B2
(45) Date of Patent: Aug. 30, 2011

(54) COMMUNICATION NETWORK UNIT AND METHOD FOR EXCHANGING CAPABILITY INFORMATION

(75) Inventors: Maik Bienas, Braunschweig (DE); Sabine van Niekerk, Unterhaching (DE); Norbert Schwagmann, Braunschweig (DE); Achim Luft, Braunschweig (DE)

(73) Assignee: Infineon Technologies AG (DE)

( * ) Notice: Subject to any disclaimer, the term of this patent is extended or adjusted under 35 U.S.C. 154(b) by 676 days.

(21) Appl. No.: 11/683,892

(22) Filed: Mar. 8, 2007

(65) Prior Publication Data

US 2008/0219223 A1  Sep. 11, 2008

(51) Int. Cl.
*H04M 3/42* (2006.01)

(52) U.S. Cl. ........ 455/416; 370/338; 370/331; 370/352; 370/392; 370/493; 455/500; 455/518; 455/519

(58) Field of Classification Search .............. 370/331, 370/338, 352, 493, 355.01, 235, 395.21, 370/392; 455/500, 518, 519
See application file for complete search history.

(56) References Cited

U.S. PATENT DOCUMENTS

| | | |
|---|---|---|
| 2003/0223570 A1 | 12/2003 | Partanen et al. |
| 2004/0082346 A1 | 4/2004 | Skytt et al. |
| 2005/0047423 A1 | 3/2005 | Kaul et al. |
| 2005/0083909 A1 | 4/2005 | Kuusinen et al. |
| 2005/0083912 A1 * | 4/2005 | Afshar et al. ............... 370/352 |
| 2005/0180394 A1 * | 8/2005 | Kautz et al. ............... 370/352 |
| 2006/0133595 A1 | 6/2006 | Ravishankar |
| 2006/0165092 A1 * | 7/2006 | Wilson et al. ............ 370/395.21 |

FOREIGN PATENT DOCUMENTS

| | | |
|---|---|---|
| EP | 1 492 304 A1 | 12/1994 |
| EP | 1 526 695 A1 | 4/2005 |
| JP | 2005-73106 A | 3/2005 |
| KP | 2003-0021222 | 3/2003 |
| WO | WO-01/44890 A2 | 6/2001 |
| WO | WO-01/93061 A1 | 12/2001 |
| WO | WO-02/075339 A1 | 9/2002 |
| WO | WO-2005/022865 A1 | 3/2005 |

OTHER PUBLICATIONS

J. Rosenberg: "A Framework for Conferencing with the Sessions Initiation Protocol (SIP)"; Network Working Group, Request for Comments: 4353.
R. Mahy et al.; "The Session Initiation Protocol (SIP) "Join" Header"; Network Working Group, Request for Comments: 3911.

* cited by examiner

*Primary Examiner* — Kamran Afshar
*Assistant Examiner* — Manpreet S Matharu
(74) *Attorney, Agent, or Firm* — Dickstein Shapiro LLP

(57) ABSTRACT

A communication network unit having a memory for storing, for each communication terminal of a plurality of first communication terminals which are each associated with a same user identification, information about communication capabilities of the respective communication terminals a determining unit for determining which communication capabilities can be used for communicating with the user identified by the user identification based on the information about the communication capabilities of the first communication terminals, and a signaling unit for signaling to a second communication terminal which communication capabilities can be used for communicating with the user identified by the user identification.

16 Claims, 7 Drawing Sheets

COMMUNICATION NETWORK UNIT AND METHOD FOR EXCHANGING CAPABILITY INFORMATION

BACKGROUND

The present invention relates generally to communication network units and methods for exchanging capability information.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
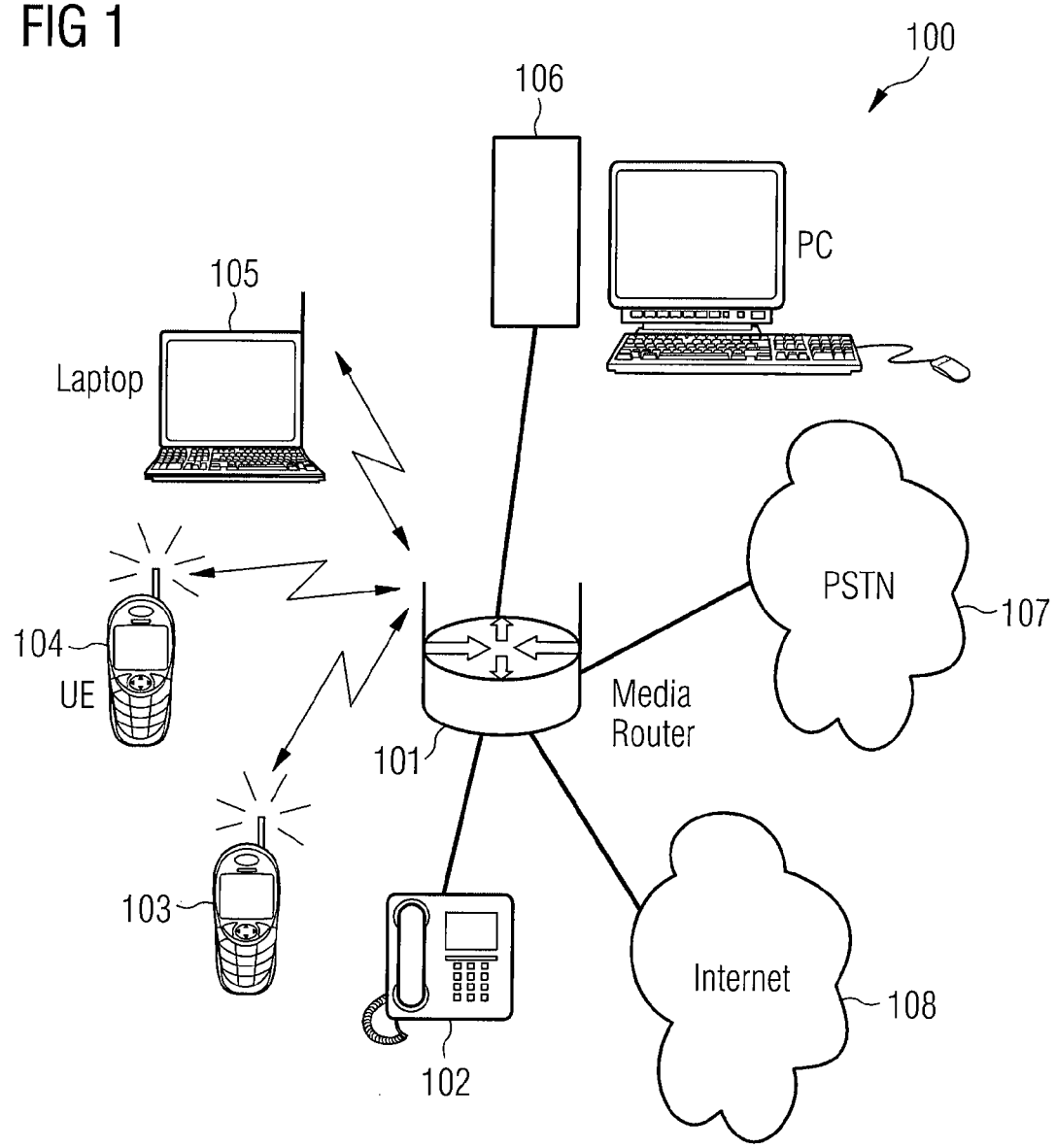
FIG. 1 shows a communication system according to an embodiment of the invention.

With the advance of communication systems and communication technologies such as mobile communication networks and computer networks a user often has not only one communication device but uses a plurality of communication devices having different capabilities for different purposes. For example, the user has a mobile phone which he uses for exchanging speech data with other users when he is not at home and uses a landline telephone when he is at home for saving costs when making calls. Further, the user may have a personal computer or a laptop which he may also use for making calls if it has a speaker and a microphone or which he may use for other ways of communication, for example for video conferencing, if a camera is provided.

Typically, these various communication devices use different protocols for transmitting communication data, for example speech data or video data, and for controlling a communication session, for example for inviting other participants to a communication session etc. For example, a mobile phone uses the protocol of a GSM (Global System for Mobile Communications) communications system or a UMTS (Universal Mobile Telecommunications System) communication system, a landline telephone transmits date according to ISDN (Integrated Services Digital Network) and a personal computer uses the voice over Internet protocol (VoIP) protocol for transmitting speech data.

Due to the different protocols and the different and changing capabilities of the various existing communication devices it is difficult with conventional systems for a user to hand over a communication session between him and another user from one communication device to another communication device or to add another communication device to the communication session which supports the usage of another type of media for communication. However, this is often desirable, for example, a user has an ongoing call with another user using his mobile phone. The other user uses his laptop for the call which would also be suitable for a video conference. During the call, the user returns home and would like to use the display and the camera of his personal computer for a video conference with the other user. For transmitting the speech data, he would like to continue to use his mobile phone. As another example, a user is at home and has a video conferencing communication session with another user. The user uses his personal computer for the video conference but would like to leave his apartment and continue the communication session without exchanging video data using his mobile phone.

A plurality of communication links may be combined to one communication session by using a conference system, for example a telephone conference system or a video conference system. In the future, a lot of communication devices will transmit communication data using the Internet protocol (IP) even in the case of speech data. That allows the usage of the signaling protocol SIP (session initiation protocol) which provides an efficient way to establish communication sessions, to modify communication sessions or to end communications sessions. The SIP also allows to control conferences. A SIP conference has a central unit which is called focus and which controls the distribution and the mixing of the communication data exchanged in the conference. The focus is not required for a communication session with only two participants. When a third participant should be added to a communication session with two participants, it is possible to incorporate a focus into the communication session and after that add the third participant or further participants.

However, the usage of SIP requires the communication devices to support SIP which may not be the case for all communication devices a user wants to use, for example in case of a common landline telephone. Additionally, it may be desirable, as in the above examples, that a communication link is handed over from a communication device to another communication device or that another communication device is added to a communication link such that a certain media type becomes useable for communication. These features are provided with high user comfort by the embodiment of the invention described in the following.

According to one embodiment of the invention, a communication network unit is provided comprising a memory for storing, for each communication terminal of a plurality of first communication terminals which are each associated with a same user identification, information about the communication capabilities of the respective communication terminals, a determining unit for determining which communication capabilities can be used for communicating with the user identified by the user identification based on the information about the communication capabilities of the first communication terminals, and a signaling unit for signaling to a second communication terminal which communication capabilities can be used for communicating with the user identified by the user identification.

According to another embodiment of the invention, a communication network unit is provided comprising a memory storing first information about communication capabilities of a first communication terminal and storing information about the communication capabilities of a second communication terminal, a processing unit generating second information about the communication capabilities of the first communication terminal using the first information about the communication capabilities of the first communication terminal and taking into account the information about the communication capabilities of the second communication terminal, a message generating unit for generating a message comprising the second information about the communication capabilities of the first communication terminal, and a transmitting unit for transmitting the message to the second communication terminal.

According to other embodiments of the invention, methods for exchanging capability information according to the communication network units according to the above embodiments of the invention are provided.

Illustratively, a central unit is provided that collects the communication capabilities of a plurality of first communication terminals associated with the same user identification, for example the communication terminals used by one user or being used by one fixed user group, for example users in the same household. The plurality of communication terminals may for example belong to a home network that is used by one user. The central unit signals the sum of the communication capabilities of the first communication terminals to a second communication terminal, for example a communication terminal belonging to another user. That the first communication terminals are all associated with the same user identification means that the first communication terminals are all used by the same user, or the same user group. The first communication terminals may for example all be associated with a name of the user or the user group or may be addressed by using a generic address associated with the user or user group. The user identification may also correspond to an address and/or an identification of the communication network unit.

In another embodiment, second information may be generated to be sent to a second communication terminal generated from first information about the communication capabilities of (at least) one first communication terminal. The second information may be generated from the first information taking into account the capabilities of the second communication device. For example, the second information specifies communication capabilities of the first communication terminal that can be used by the second communication terminal for communicating with the first communication terminal.

Embodiments of the invention can be implemented using software components, hardware components, or both hardware and software components. Special circuits may be used, for example programmable logic circuits, e.g., microprocessors. A memory used in the embodiments of the invention may be a volatile memory, for example a DRAM (Dynamic Random Access Memory) or a non-volatile memory, for example a PROM (Programmable Read Only Memory), an EPROM (Erasable ROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In the embodiment described above, the first communication terminals signal their communication capabilities to the communication network unit, for example.

In one embodiment, a communication connection is established between a first communication terminal of the plurality of first communication terminals and the second communication terminal and the determining unit determines which communication capabilities of the first communication terminal can be used for communicating with the second communication terminal and determines which of the communication capabilities of the other communication terminals of the plurality of first communication terminals can be used for communicating with the second communication terminal. The signaling unit may signal to the second communication terminal the communication capabilities of the first communication terminal that can be used for communicating with the second communication terminal as being available and signal the communication capabilities of the other communication terminals of the plurality of first communication terminals that can be used for communicating with the second communication terminal as being conditionally available. In this way, the user of the second communication terminal is informed that a communication capability is definitely available since the first communication terminal has the communication capability or may not be available because only one of the other communication terminals has the capability and the user of the other communication terminal may not be able to use it right now or may not want to use it right now.

The communication network unit may comprise another signaling unit notifying communication terminals of the plurality of first communication terminals about the communication connection between the first communication terminal of the plurality of first communication terminals and the second communication terminal. In one embodiment, the other signaling unit notifies those communication terminals of the plurality of first communication terminals about the communication connection between the first communication terminal of the plurality of first communication terminals and the second communication terminal that have communication capabilities that can be used for communication with the second communication terminal. For example, those communication terminals of the plurality of first communication terminals that do not have communication capabilities that can be used for communicating with the second communication terminal are not notified about the communication connection. In this way, unnecessary notification is avoided.

At least one of the communication terminals of the communication terminals being informed about the communication connection may comprise a reporting unit informing a user about the communication connection.

The reporting unit may also inform the user about communication capabilities of the at least one other communication terminal that can be used for communicating with the second communication terminal. In this way, the user gets informed about communication capabilities of his other communication terminals that he can use for communication with the second communication terminal. Since the user is informed not only about the capabilities of the first communication terminal that could be used for communicating with the second communication terminal but also about communication capabilities of his other communication terminals that can be used for communicating with the second communication terminal, he will more often use the various communication capabilities of his communication terminals. By means of the reporting unit, the at least one other communication terminal may offer to the user to take part in the communication between the first communication terminal and the second communication terminal or to initiate a handover of the communication connection to the at least one other communication terminal such that there is a communication connection between the at least one other communication terminal and the second communication terminal. In this way, the user can easily initiate communication between the at least one other communication terminal and the second communication terminal, for example by pressing a button or selecting an item on a display, without the need to determine an address of the second communication terminal.

In one embodiment, for handing over the communication connection, a conference is established between the first communication terminal, the at least one other communication terminal and the second communication terminal. In this way, the communication connection can be handed over to the at least one other communication terminal without interruption.

In one embodiment, the signaling unit signals the communication capabilities using a call control protocol (such as the SIP protocol). Also, at least one of the communication terminals signaling information about its communication capabilities uses a call control protocol. At least one of the communication terminals may use another protocol for sending and receiving control information and the communication network may further comprise a converting unit converting messages according to the other protocol to the call control protocol and converting messages according to the call control protocol to the other protocol.

For example, the signaling unit signals the communication capabilities using the SIP protocol and/or at least one of the communication terminals signals information about its communication capabilities using the SIP protocol. At least one of the communication terminals may use another protocol for sending and receiving control information and the communication network may further comprise a converting unit converting messages according to the other protocol to the SIP protocol and converting messages according to the SIP protocol to the other protocol.

Similarly, the message comprising the second information may be generated and transmitted according to a call control protocol or the SIP protocol.

In the near future, a lot of communication terminals will support the usage of SIP. SIP allows to react to changes of the characteristics of a communication terminal, for example if the type of communication data a communication terminal supports changes. The converting unit allows to use communication terminals which do not support SIP. For example, it is possible that analog telephones at least partly use the functionality provided by the communication network unit (which is denoted by media router in the embodiments described below).

FIG. 1 shows a communication system 100 according to an embodiment of the invention.

The communication system 100 comprises a media router 101 to which all communication devices (communication terminals) a user wants to use are coupled. In this example, this is a landline telephone 102, a wireless landline telephone (for example a DECT, digital enhanced cordless telecommunications, telephone) 103, a mobile terminal 104, for example a mobile terminal for using an UMTS (Universal Mobile Telecommunications Standard) communication network, a CDMA2000 (CDMA: Code Division Multiple Access) communication network, a FOMA (Freedom of Mobile Access) communication network or a GSM (Global System for Mobile Communications) communication network, a laptop 105 and a personal computer 106. The media router 101 is for example located at the users home and the communication devices 102 to 106 are coupled to the media router 101 via cable, via a WLAN connection, via a DECT connection, via a Bluetooth connection or via a UWB connection.

The media router 101 allows access to a public switched telephone network (PSTN) 107 and the internet 108. The media router 101 together with the user's communication devices 102 to 106 are also denoted as the home network of the user (even though the user may take his mobile devices with him). The landline telephone 102 and the wireless landline telephone 103 can be analog or digital telephones (for example ISDN telephones). They may support SIP but it is not necessary that they support SIP as will be explained later. The user's communication devices 102 to 106 may be all associated with the same user identification, namely an identification of the user of the home network. The identification of the user may also correspond to an identification (or an address) of the media router 101 such that it can be determined that all data transmitted to one of the user's communication devices 102 to 106 should be routed to the media router 101.

The logical structure of the media router is explained in the following with reference to FIG. 2.

Figure 2:
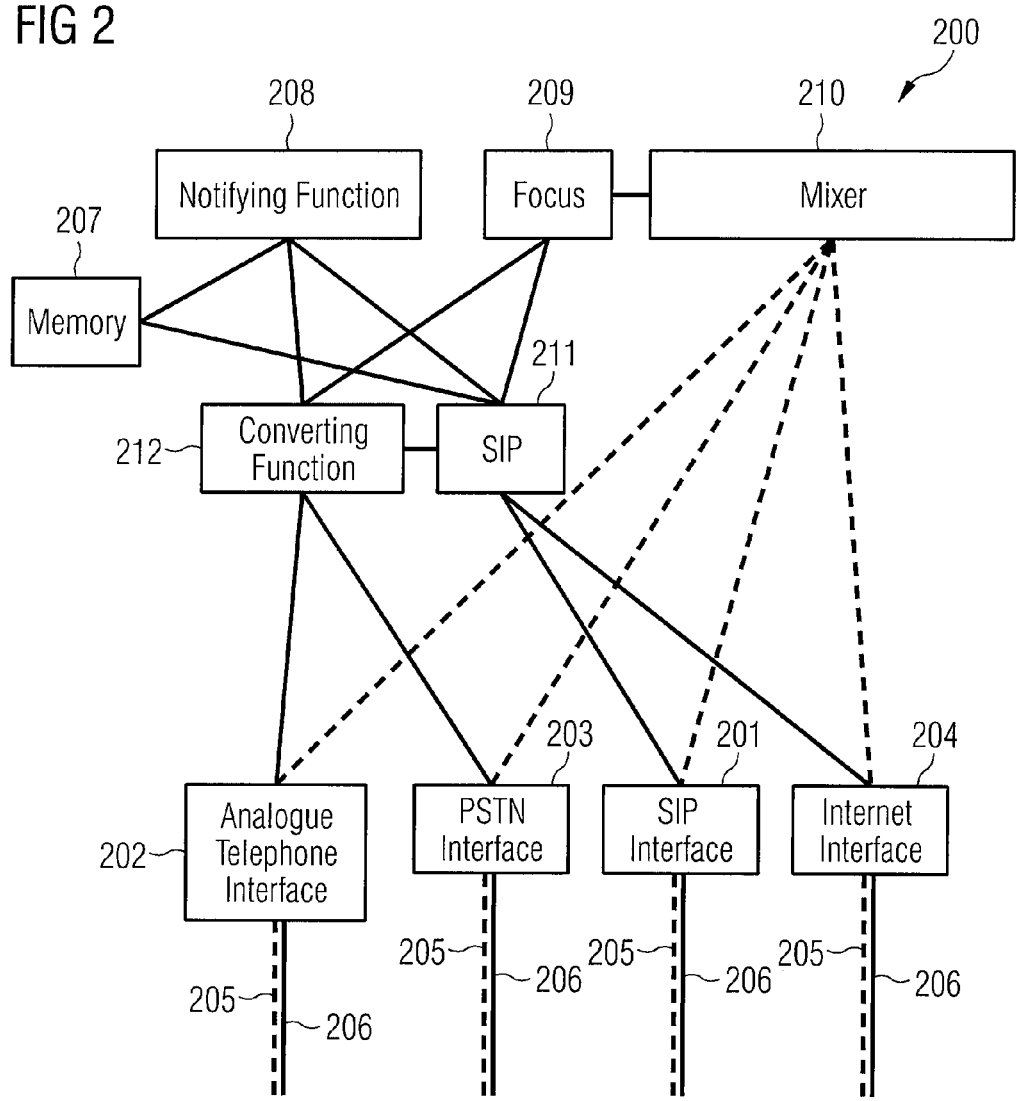
FIG. 2 shows a media router according to an embodiment of the invention.

FIG. 2 shows a media router 200 according to an embodiment of the invention.

The media router 200 has a SIP interface 201 by which communication devices supporting SIP can be connected to the media router 200, for example SIP telephones. The media router 200 also comprises an analog telephone interface 202 by which "normal" telephones, this means e.g. telephones not supporting SIP, for example a conventional landline telephone, can be connected to the media router 200. The media router 200 further comprises a PSTN interface 203 by which it can be connected to the PSTN 107 and an internet interface 204, by which it can be connected to the internet 108.

Via the interfaces 201 to 204, the media router 200 sends and receives media data (this means communication data) 205 and signaling data (control data) 206. The flow of media data is shown in dashed lines and the flow of control data is shown in solid lines in FIG. 2.

The communication devices 102 to 106 and communication networks like the internet 108 or the PSTN 107 can be coupled to the media router using suitable plug sockets or using a wireless connection for which the media router 200 comprises a suitable transceiver.

The media router 200 knows the connections status of all the communication devices 102 to 106. For example, the media router 200 knows which of the communication devices 102 to 106 have an active connection to the media router 200. This information for all the communication devices 102 to 106 of the user is for example stored in a memory 207. The media router 200 comprises a notifying function 208 by which it can notify all communication devices 102 to 106 that support SIP of the connection status of the other communication devices 102 to 106. The notifying function 208 may further inform a communication device 102 to 106 supporting SIP about the SIP addresses (SIP URI, uniform resource indicator) of the other communication devices 102 to 106 connected to the media router 200 and supporting SIP.

The media router 200 further comprises the functionality of a focus 209 and a mixer 210 such that it can provide and control conferences between the user's communication devices 102 to 106. The necessary functions according to SIP are provided by a SIP unit 211. The mixer 210 allows to combine a plurality of media streams and forward them for example to a communication device participating in a conference.

External communication devices, this means communication devices which are not part of the home network of the user and are coupled to the media router 200 for example via the internet 108, via the PSTN 107 or via another communication network to which the media router 200 is coupled, do not have the same rights as the communication devices 102 to 106 of the home network of the user in one embodiment. For example, external communication devices are not notified by the notifying function 208 of the connection status of the communication devices 102 to 106 of the home network or allowed to set up conferences using the focus 209.

By using one of the communication devices 102 to 106, the user can inform himself about the connection status of the other communication devices 102 to 106 of his home network. He may also set up a conference using the focus 209 or he may add a communication device 102 to 106 to an existing conference for example to allow the usage of an additional media type.

A converting function 212 allows communication devices not supporting SIP to participate in SIP conferences.

In the following, it is explained how a communication device may be added to a communication session between two other communication devices or how a communication connection may be handed over from one communication device of the home network of the user to another communication device of the home network of the user.

Figure 3:
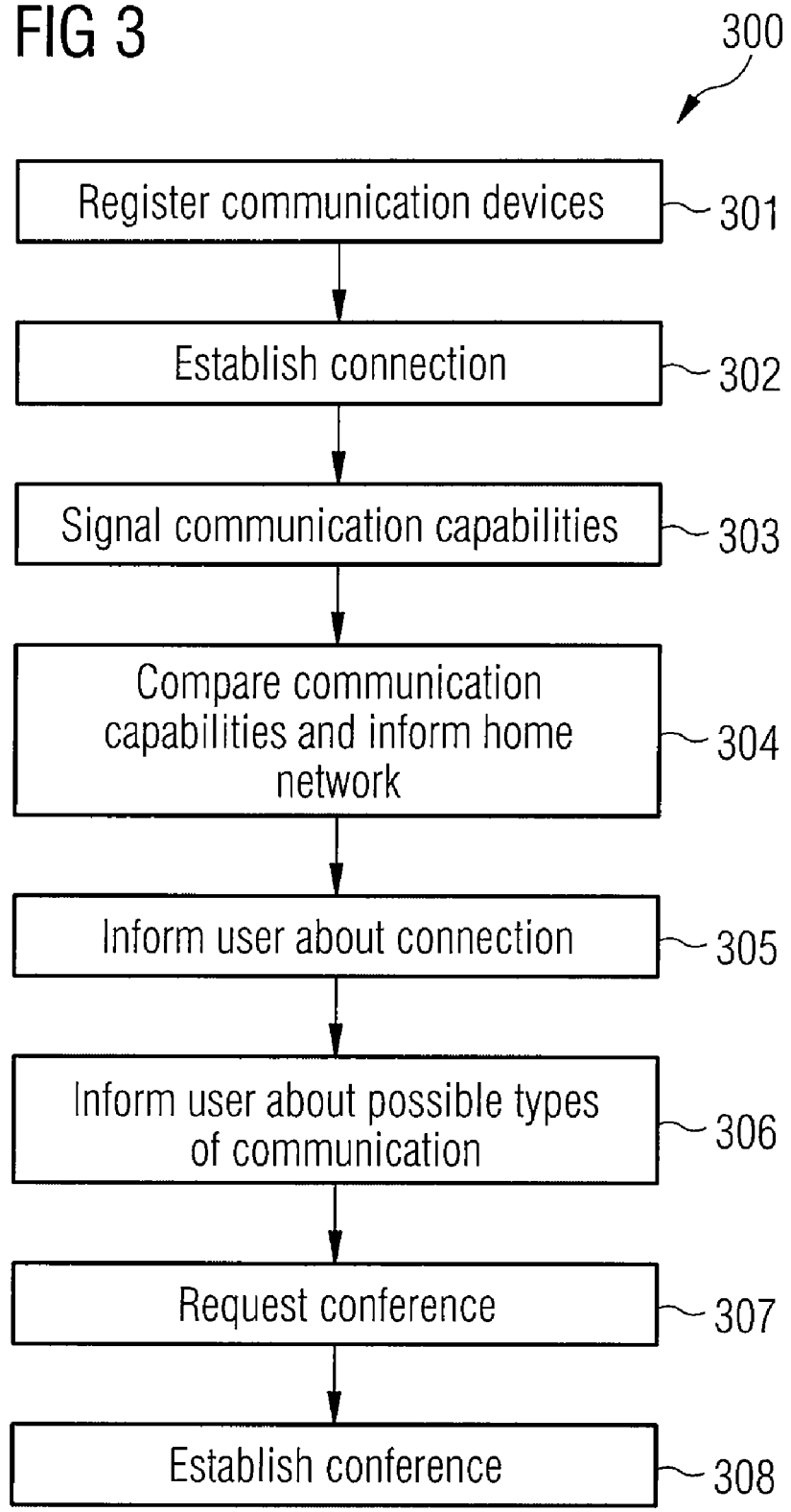
FIG. 3 shows a flow diagram according to an embodiment of the invention.

FIG. 3 shows a flow diagram 300 according to an embodiment of the invention.

In 301, the communication devices 102 to 106 or communication devices of the communication devices 102 to 106 which have recently been added to the home network register themselves with the media router 200 to be informed about the connection status of the other communication devices 102 to 106. When a communication device 102 to 106 is newly added to the home network, for example when it is registered with the media router 101 or when it has a connection with the media router 101 for the first time, it informs the media router 101 about its communication capabilities and the media router 101 stores this information in the memory 207. For example a communication device 102 to 106 that should be added to the home network of the user, for example when the user has recently bought the communication device 102 to 106, is registered with the media router 101 as being a new part of the home network of the user and the media router 101 is informed about the communication capabilities of the communication device 102 to 106. It is not necessary that the communication devices 102 to 106 always have an active connection to the media router 101. The media router 101 detects if a communication device 102 to 106 has an active connection and if this is the case, it may notify all the other communication devices 102 to 106 that have registered for being notified about the communication status of the other communication devices 102 to 106 that the communication device 102 to 106 has an active connection to the media router 101. The registering of a communication device 102 to 106 as being a new part of the communication network of the user may automatically include the registering for being notified about the connection status of the other communication devices 102 to 106.

In 302, the user uses a first communication device 102 to 106 of his home network to establish a connection to a second communication device. The second communication device may also be a communication device of the home network of the user or may also be an external communication device, this means a communication device that is not part of the home network of the user but is coupled to media router 101 via the internet 108, the PSTN 107 or via another communication network. The establishment of a communication connection initiates the notifying functionality which is carried out in 303.

In 303, if the second communication device is an external communication device, the media router 101 informs the external communication device about the communication capabilities of all the communication devices 102 to 106 of the home network of the user. This is for example the sum of all communication capabilities of the communication devices 102 to 106 of the home network. This means that a communication capability is being signaled to the external communication device as being available if at least one communication device 102 to 106 of the communication devices 102 to 106 of the home network has this communication capability. It is also possible that only the communication capabilities of the first communication device are signaled as being available and a communication capability that at least one of the communication devices 102 to 106 of the home network of the user has but the first communication device has not is signaled as being conditionally available.

The second communication device responds to the information about the communication capabilities of the communication devices 102 to 106 of the home network of the user with the information about its own communication capabilities.

In 304, the media router 101 compares the communication capabilities of the communication devices 102 to 106 of the home network of the user with the communication capabilities of the second communication device, i.e. the external communication device. Then, the media router 101 informs all communication devices 102 to 106 of the home network which have a connection to the media router 101 about the communication connection between the first communication device and the second communication device. This also comprises the necessary data to allow a communication device 102 to 106 of the home network to add itself to the communication connection (for example an identification of the communication connection by which it can be referenced) and the information of which type of communication data the communication device 102 to 106 could use to communicate with the external communication device (for example speech data, video data, text messages etc.) based on its own capabilities and the capabilities of the external communication device. A communication device 102 to 106 is not notified about the communication connection between the first communication device and the second communication device if there is no type of communication data that could be used for a communication between the communication device 102 to 106 and the external communication device.

In 305 each of the communication devices 102 to 106 informs the user about the communication connection between the first communication device and the second communication device. For example, each of the communication devices 102 to 106 displays a certain text or symbols or outputs acoustic signals to inform the user which of the communication devices 102 to 106 is participating in the communication connection.

In 306, each communication device 102 to 106 which has been informed about the communication connection gives the user the opportunity to add itself to the communication connection and allow the user to use the communication device 102 to 106 for participating in the communication connection using the type of communication data that the respective communication device 102 to 106 can use for communicating with the second communication device as it was signaled in 304. For example, a communication device 102 to 106 proposes the user to establish a conference with the first communication device, the second communication device and itself as participants for allowing the user to communicate using the communication data that the communication device is suitable for, for example video data.

If the user agrees to the establishment of a conference as it was proposed by one of the communication devices 102 to 106 and has selected the type of communication data that should be used for communicating using the communication device, the communication device sends a message requesting the establishment of a conference to the media router 101 wherein the communication device participates as third communication device together with the first communication device and the second communication device using the selected type of communication data for communication.

In 308, the media router 101 informs the first communication device and the second communication device that the communication connection is converted to a conference and transmits information about the conference, for example necessary parameters for participating in the conference, to the first communication device and the second communication device. The media router 101 controls the mixing and forwarding of the communication data. Also, depending on the communication capabilities of the first communication device and the third communication device communication data may be separated. For example, the first communication device is used by the user for transmitting and receiving speech data to and from the second communication device and the third communication device is used for transmitting and receiving video data to and from the third communication device. When the second communication device transmits both video and speech data to the media router 101, the speech data and video data are separated by the media router 101 and are transmitted to the first communication device or the third communication device, respectively. The conference between the first communication device, the second communication device and the third communication device is finally established and the first communication device and the third communication device are both connected to the second communication device.

It is also possible that the communication connection is handed over from the first communication device to the third communication device. In this case, the first communication device no longer communicates with the second communication device. This may be realized by establishing a conference between the first communication device, the second communication device and the third communication device and than taking the first communication device from the conference. Alternatively, the communication connection between the first communication device and the second communication device may be handed over to the third communication device without establishing a conference in-between.

In the following, the message flow for an example where a communication device is added to an established communication connection is described. SIP is used for the signaling.

Figure 4:
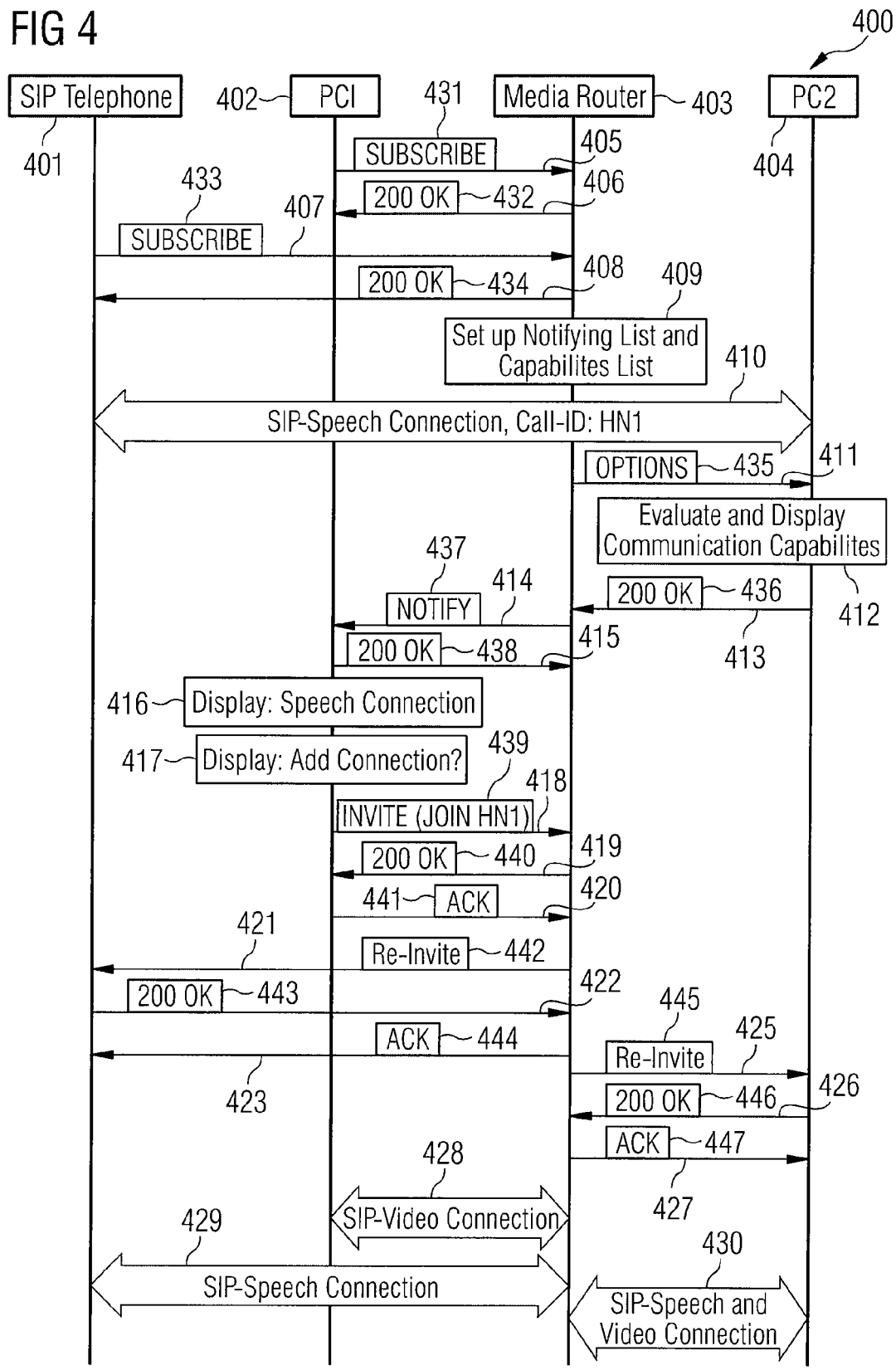
FIG. 4 shows a message flow diagram according to an embodiment of the invention.

FIG. 4 shows a message flow diagram 400 according to an embodiment of the invention.

The message flow takes place between a first communication device of the home network of the user, in this example a SIP telephone 401, a second communication device of the home network of the user, in this example a first personal computer 402, the media router 403 corresponding to the media router 101 of the communication system 100 and an external communication device used by another user, in this example a second personal computer 404.

The first personal computer 402 is suitable for communication using video data or speech data. The second personal computer 404 is also suitable for communicating using in speech data or video data.

In 405, the first personal computer 402 registers with the media router 403 for the notifying service, i.e. to be notified about the connection status of all the communication devices of the home network of the user. For this, the first personal computer 402 sends a first subscribe message 431 to the media router 403. The first subscribe message 431 also comprises the information about the communication capabilities of the first personal computer 402. In this case, these are the capabilities to exchange speech data, video data both the speech and video data simultaneously and for example instant text messages. The media router 403 registers the first personal computer 402 for the notifying service and acknowledges the registration for the notifying service in 406 by sending a first 200 OK message 432 to the first personal computer 402.

Analogously, the SIP telephone 401 registers for the notifying service in 407 by transmitting a second subscribe message 433 to the media router 403 which is confirmed in 408 by the media router 403 by sending a second 200 OK message 434 to the SIP telephone 401. The second subscribe message 433 contains information about the communication capabilities of the SIP telephone 401, in this example the ability for communication using speech data and using instant text messages (or for example also instant voice data messages).

In 409, the capabilities of the first personal computer 402 and the SIP telephone 401 are stored in a capabilities list in the memory 207 of the media router 403. Further, it is stored in a notifying list that a first personal computer 402 and the SIP telephone 401 should be notified if the connection status of a communication device of the home network of the user changes.

In 410, the user establishes a SIP speech connection using his SIP telephone 401 to the second personal computer 404. This communication connection is associated with the connection identification (Call-ID) "HN1". The media router 403 stores the SIP addresses (SIP URIs) of both participants, in this case of the SIP telephone 401 and the second personal computer 404, the connection identification, a so called "to-tag" identifying the SIP application in the second personal computer 404, a so called "from-tag" identifying the SIP application in the SIP telephone 401 and the information about type of the established communication connection in this case the information that a SIP speech connection is established. The media router 403 may also store information about the communication capabilities of the second personal computer 404, in this case the capability to communicate via speech data and video data, if this information is given during transmitted by the second personal computer 404 during the establishment of the communication connection.

In 411, the media router 403 informs the second personal computer 404 about the communication capabilities of the communication devices of the home network using an options message 435. As explained above, a communication capability is signaled to be available if the communication device participating in the established communication connection, in this case the SIP telephone 401, has the communication capability, in this case the capabilities to exchange speech data and instant messages since these communication capabilities can be provided by the communication device currently used. The communication capabilities of the other communication devices connected to the media router 403 of the home network of the user which the SIP telephone 401 does not have itself are signaled as being conditionally available. In this example these are the communication capabilities provided by the first personal computer 402 and not provided by the SIP telephone 401, namely the capability to communicate using video data and both speech data and video data simultaneously.

In 412, the second personal computer 404 evaluates the communication capabilities of the home network of the user and asks the other user, i.e. the user of the second personal computer 404, whether he wants to use any communication capabilities that both are provided by the second personal computer 404 and the home network of the user. For example, the second personal computer 404 displays the question whether the other user would like to send an instant message to the user or displays that conditionally it is possible to communicate using video data and displays the question whether it should be tried to establish a video communication session. For example, the second personal computer 404 displays buttons labeled yes or no for answering these questions and when the other user selects the button labeled yes the corresponding function is carried out. In this example, it is assumed that the other user does not initiate any change of the communication connection.

In 413, the second personal computer 404 acknowledges the reception of the options message 435 by sending a third 200 OK message 436 to a media router 403. The third 200 OK message 436 may also hold the information about the communication capabilities of the second personal computer 404. These may already have been signaled to the media router 403 when establishing the communication connection.

The communication capabilities of the second personal computer 404 are in this example the capabilities to communicate using speech data, video data, both speech and video data simultaneously or using instant messages. These communication capabilities are categorized and signaled as being "available".

The media router 403 compares the communication capabilities of the second personal computer 404 with the communication capabilities of the home network stored in the capabilities list. Further, in 414, the media router 403 notifies the first personal computer 402 using a notify message 437 about the established communication connection between the SIP telephone 401 and the second personal computer 404. The notify message 437 comprises the SIP addresses of the SIP telephone 401 and the second personal computer 404, the to-tag, the from-tag, the connection identification, the type of the connection (speech) and the communication capabilities that both the first personal computer 402 and the second personal computer 404 have. The first personal computer 402 acknowledges the receipt of the notify message 437 in 415 by sending a fourth 200 OK message 438 to the media router 403.

In 416, the first personal computer 402 notifies the user about the established speech connection between the SIP telephone 401 and the second personal computer 404. For example an acoustical signal is output and on the display of the first personal computer 402 it is shown that a speech connection is established to the other user.

In 417, the first personal computer 402 evaluates the communication capabilities that both the first personal computer 402 and the second personal computer 404 have. As a result it determines that it would possible to communicate between the first personal computer 402 and the second personal computer 404 by exchanging speech data, video data, both speech and video data simultaneously and instant messages. The first personal computer 402 offers the user to add the first personal computer 402 to the communication session between the SIP telephone 401 and the second personal computer 404 using the communication capabilities that both the first personal computer 402 and the second personal computer 404 have. For example, the first personal computer 402 displays: "Would you like to participate in the communication session?" and offers as answers for example in form of labeled buttons: "yes, using video and speech", "yes, using speech", "yes, using video", "yes, using text", "no". By clicking one of the labeled buttons the user can initiate the corresponding functionality. It is assumed that the user selects "yes, using video" and clicks the corresponding button in 417.

In 418, the first personal computer sends an invite message 439 to the media router 403. The invite message 439 comprises a so called "join header" which indicates that the first personal computer 402 should be added to the communication session between the SIP telephone 401 and the second personal computer 404. The invite message 439 further comprises the connection identification for referencing the communication session to which the first personal computer 402 should be added, the from-tag and the to-tag. Further, it is indicated in the invite message 439 what type of communication data the first personal computer 402 wants to use for communicating with the second personal computer 404, in this example video data.

The invite message 439 is acknowledged in 419 by the media router 403 using a fifth 200 OK message 440. The first personal computer 402 acknowledges this in 420 using a first ACK message 441.

The media router 403 now starts to convert the communication connection between the SIP telephone 401 and the second personal computer 404 to a conference allowing exchange of video communication data. For this, it provides the functionality of a focus and a mixer. The focus serves as terminal point for the SIP signaling for the devices participating in the conference, in this case the SIP telephone 401, the first personal computer 402 and the second personal computer 404. The media router 403 also provides an address for the conference that is established, in this case a conference URI. The mixer adapts and forwards the media streams, i.e. the communication data exchanged in the conference, such that it is useable by the participating communication devices. For converting the communication connection to a conference, the media router 403 further sends a first re-invite message 442 to the SIP telephone 401 in 421. The first re-invite message 442 comprises the conference URI. The SIP telephone 401 acknowledges the receipt of the first re-invite message 442 by sending a SIP 200 OK message 443 to the media router 403 in 422. The media router 403 acknowledges this in 423 by sending a second ACK message 444 to the SIP telephone 401.

Similarly, the media router 403 sends a second re-invite message 445 to the second personal computer 404 in 425. The second re-invite message 445 comprises the information that now also video data is exchanged in addition to a speech data. The second personal computer 404 sends a seventh 200 OK message 446 for acknowledgement in 426 which is acknowledged by the media router 403 using a third ACK message 447 in 427.

Now, the conference between the SIP telephone 401, the first personal computer 402 and the second personal computer 404 is established. For this, there exists a SIP video connection 428 between the first personal computer 402 and the media router 403, a SIP speech connection 429 between the SIP telephone 401 and the media router 403 and a SIP speech and video connection 430 between the second personal computer 404 and the media router 403. The second personal computer 404 can send and receive both speech and video data, the SIP telephone 401 can send and receive only speech data and the first personal computer sends and receives only video data. The mixer 210 of the media router 403 receives all communication data and forwards the speech data sent from the second personal computer 404 to the SIP telephone 401, the video data sent from the second personal computer 404 to the first personal computer 402, the video data send from the first personal computer 401 to the second personal computer 404 and the speech data send from the SIP telephone 401 to the second personal computer 404.

In the following, an example is described where a communication connection is handed over from one communication device to another communication device of the home network. Again, SIP is used for signaling.

Figure 5:
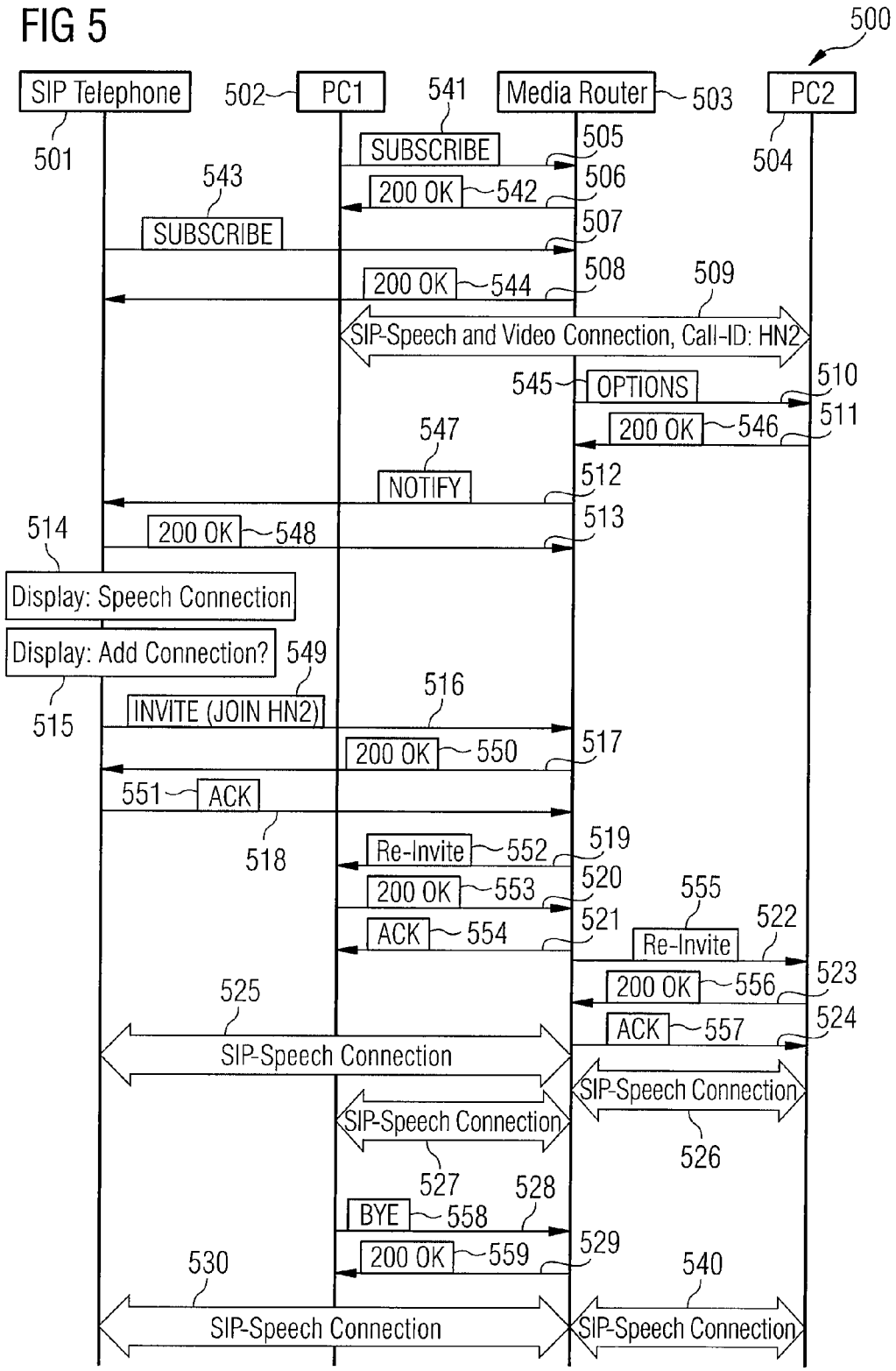
FIG. 5 shows a message flow diagram according to an embodiment of the invention.

FIG. 5 shows a message flow diagram 500 according to an embodiment of the invention.

Analogously to FIG. 4, the message flow takes place between a SIP telephone 501, a first personal computer 502, a media router 503, and a second personal computer 503. Analogously to the steps 405, 406, 407 and 408, the first personal computer 502 registers for the notifying service in 505 using a first subscribe message 541 which is acknowledged in 506 by a first 200 OK message 542 and the SIP telephone 501 registers for the notifying servers by sending a second subscribe message 543 in 507 which is acknowledged in 508 by a second 200 OK message 544.

In 509, the user establishes a speech and video connection between the first personal computer 502 and the second personal computer 504. The communication identification (call ID) "HN2" is assigned to the communication connection. The media router 503 stores the SIP addresses of the first personal computer 502 and the second personal computer 504, the connection identification, a to-tag identifying the SIP application on the second personal computer 504, a from tag- identifying the SIP application on the first personal computer 502 and a specification of the type of the communication connection, in this case a speech and video connection.

In 510 the video router 503 informs the second personal computer 502 about the communication capabilities of the communication devices of the home network of the user using an option message 545. The communication capabilities are categorized as being available or conditionally available as explained above. In this example, the capabilities to communicate using speech data, video data, both speech and video data simultaneously and instant messages are categorized as being available. The second personal computer answers the option message 545 in 511 using a third 200 OK message 546 comprising a specification of the communication capabilities of the second personal computer 504. In this case these are the capabilities to communicate using speech data, video data, both speech and video data simultaneously and instant messages. These capabilities are all categorized as being available. The media router 503 compares the communication capabilities of the second personal computer 504 with both of the devices of the home network of the user and notifies the SIP telephone 501 in 512 using a notify message 547 about the connection between the first personal computer 502 and the second personal computer 504. The notify message 547 comprises the SIP addresses of the first personal computer 502 and the second personal computer 504, the to-tag, the form-tag, the connection identification and a specification of the communication capabilities that both the second personal computer 504 and the SIP telephone 501 have, in this example the capabilities to communicate using speech data and instant messages. Further, the notify message 547 comprises information about the type of the communication connection between the first personal computer 502 and the second personal computer 504. The SIP telephone 501 acknowledges the receipt of the notifying message 547 in 513 using a fourth 200 OK message 548. Other communication devices of the home network of the users that are registered for the notifying service are informed analogously to the SIP telephone 501.

In 514, the SIP telephone 501 informs the user about the connection between the first personal computer 502 and the second personal computer 504, for example, a display button (soft key) is shown on the display on the SIP telephone 501 and a blinking symbol of a telephone receiver.

In 515, the SIP telephone 501 evaluates which communication capabilities both the SIP telephone 501 and the second personal computer 504 have. In this example, the SIP telephone 501 and the second personal computer 504 could communicate using speech data and instant messages. These possibilities are shown to the user. For example, the user clicks on the display button next to the blinking telephone receiver and on the display of the SIP telephone the text "connection to other user, take over with 1, establish conference with 2, send instant message with 3" is shown. The user can take over the connection between the first personal computer 502 and the second personal computer 504, this means initiate a hand over of the communication connection from the first personal computer 502 to the SIP telephone 501, by pressing the button 1 of the SIP telephone 501, establish a conference between the SIP telephone 501, the first personal computer 502 and the second personal computer 504 by pressing button two and write and send an instant message to the second personal computer 504 by pressing button 3.

In this example, it is assumed that the user presses the button 1 for taking over the connection. Since it is obvious for the user that the SIP telephone 501 has no video functionality, it is not explicitly shown in one embodiment that when the user decides to take over the connection, there will only a speech connection and not both a speech and video connection. This means that when the communication connection is handed over, the users will communicate using speech data and not both video data and speech data.

In 516, the SIP telephone 501 sends an invite message 549 to the media router 503. The invite message 549 comprises a join header for indicating that the SIP telephone 501 wishes to participate in an existing communication connection. For referencing the existing communication connection the invite message 549 comprises the connection identification (HN2), the from-tag and the to-tag. Further, the invite message 549 comprises the specification of the type of communication data the SIP telephone 501 whishes to use for communication, in this case speech data. In 517 the media router 503 acknowledges the receipt of the invite message 549 by a fifth 200 OK message 550 which is acknowledged by the SIP telephone 501 in 518 by a first ACK message 551.

The media router 503 now starts to convert the communication between the first personal computer 502 and the second personal computer 504 to a conference and to remove the video component of the communication connection this means to stop the possibility to exchange video data. For the conference, the media router 503 provides the functionality of a focus and a mixer. For converting the communication connection to a conference, the media router sends a first re-invite message 552 to the first personal computer 502 in 519 comprising the conference ID assigned to the conference and comprising the information that the conference is a speech conference and video data can now longer be exchanged. The first personal computer 502 acknowledges the receipt of the re-invite message 552 using a sixth 200 OK message 553 which is acknowledged by the media router 503 in 521 by a second ACK message 554.

Similarly, the media router 503 informs the second personal computer 504 in 522 about the conference URI using a second re-invite message 555 that also comprises the information that the conference is for speech data only. The second personal computer 504 acknowledges this in 523 using a seventh 200 OK message 556 which is acknowledged in 524 by a second ACK message 557.

Now, a speech conference is established between the SIP telephone 501, the first personal computer 502 and the second personal computer 504. For this, the SIP telephone 501 has a SIP speech connection 525 to the media router 503, the first personal computer 502 has a SIP speech connection 527 to the media router 503 and the second personal computer 504 has a SIP speech connection 526 to the media router 503.

Since it is not necessary for the user to use both the SIP telephone 501 and the first personal computer 502 for sending speech data, it is assumed that he decides that he no longer whishes to use the first personal computer 502 for participating in the conference. Therefore he cancels the connection from the first personal computer 502 to the media router 503, for example by pressing a certain button or a certain field using the computer mouse on the display of the first personal computer 502. In 528, the first personal computer 502 then sends a bye message 558 to the media router 503 to indicate that he whishes to leave the conference. The media router 503 acknowledges this in 529 using an eighth 200 OK message 559 and an ends the SIP speech connection 527 to the first personal computer 502. After that, the communication connection has been successfully converted from a speech and video connection to a speech connection and handed over from the first personal computer 502 to the SIP telephone 501. Now, there exists an SIP speech connection 530 between the SIP telephone 501 and the media router 503 and a SIP speech connection 540 between the media router 503 and the second personal computer 504.

In the above examples, the SIP was used for signaling and it was assumed that all participating communication devices support SIP. However, in one embodiment it is also possible that normal telephones not supporting SIP are connected to the media router 101 and use at least partially the functionality provided by the media router 101. For this, the media router provides the functionality to convert the signaling used by normal telephones to SIP signaling and vice versa. If for example an analog telephone is connected to the media router its connection status is monitored similarly as an in the case of a communication device supporting SIP and all communication devices registered for the notifying service are notified about the connection status of the analog telephone. When the analog telephone (or another communication device not supporting SIP) of the home network of the user has a connection to an external communication device, the notifying function 208 of the media router 200 notifies all communication devices supporting SIP similarly to the examples described with reference to FIGS. 4 and 5 about the connection. In this case, the from-tag identifies the SIP application of the media router if the connection was initiated by the analog telephone. Similarly, if the connection was established by the external communication device, the to-tag identifies the SIP application of the media router. The identification of this SIP application of the media router is for example provided by the converting function 212 of the media router 200. The SIP application provides a virtual SIP client for the analog telephone which communicates with other SIP units as a representation of the analog telephone. The SIP application communicates with the analog telephone using the analog telephone's own protocol.

The media router provides SIP functionality for analog telephones for example in the following way. If a user whishes to be added to an established communication connection using an analog telephone, he for example lifts the telephone receiver and presses dialing buttons associated with this functionality. For example he presses the buttons # and 1. The media router interprets that as having received the invite message 439, 549 in the above examples, for example, the converting function 212 accordingly signals to other units of the media router 200, for example the notifying function 208 that the analog telephone should be added to an established communication connection. By default it is assumed that the analog telephone does want to use speech data for communication and this is accordingly signaled to the other communication devices connected to the media router.

The communication connection to which the analog telephone should be added can for example be identified by the number that is pressed after the #. For example, a 1 means that the communication identification of the communication connection that was established last should be used and the analog telephone should be added to the communication connection established last. If there are more than one communication connections established, different numbers may correspond to different communication connections, for example the number 2 references the communication connection which was build up as the next to last connection, 3 references the communication connection which was build up as the last but two connection and so on.

Further signaling between the analog telephone and the media router is not necessary. The signaling between the media router and the other communication devices can be performed as in the exampled described above with reference to FIGS. 4 and 5.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

In the following, two embodiments of the invention are described with reference to FIG. 6, FIG. 7 and FIG. 8.

Figure 6:
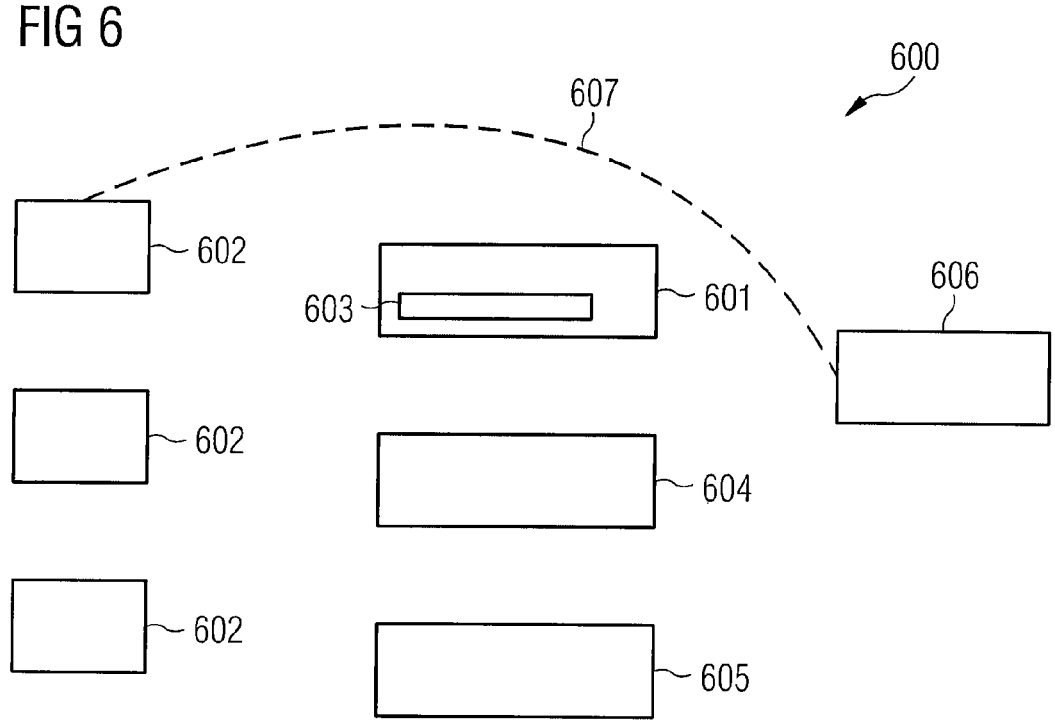
FIG. 6 shows a communication network according to an embodiment of the invention.

FIG. 6 shows a communication network 600 according to an embodiment of the invention.

The communication network unit 600 comprises a memory 601 that stores for each communication terminal of a plurality of first communication terminals 602 which are each associated with a same user identification, information 603 about the communication capabilities of the respective communication terminals 602.

Further, the communication network unit 600 comprises a determining unit 604 that determines which communication capabilities can be used for communicating with the user identified by the user identification based on the information 603 about the communication capabilities of the first communication terminals 602.

The communication network unit 600 comprises a signaling unit 605 that signals to a second communication terminal 606 which communication capabilities can be used for communicating with the user identified by the user identification.

In one embodiment, a communication connection 607 is established between a first communication terminal of the plurality of first communication terminals 602 and the second communication terminal 606, and the determining unit 604 determines which communication capabilities of the first communication terminal 602 can be used for communicating with the second communication terminal 606 and determines which of the communication capabilities of the other communication terminals of the plurality of first communication terminals 602 can be used for communicating with the second communication terminal 606.

Figure 7:
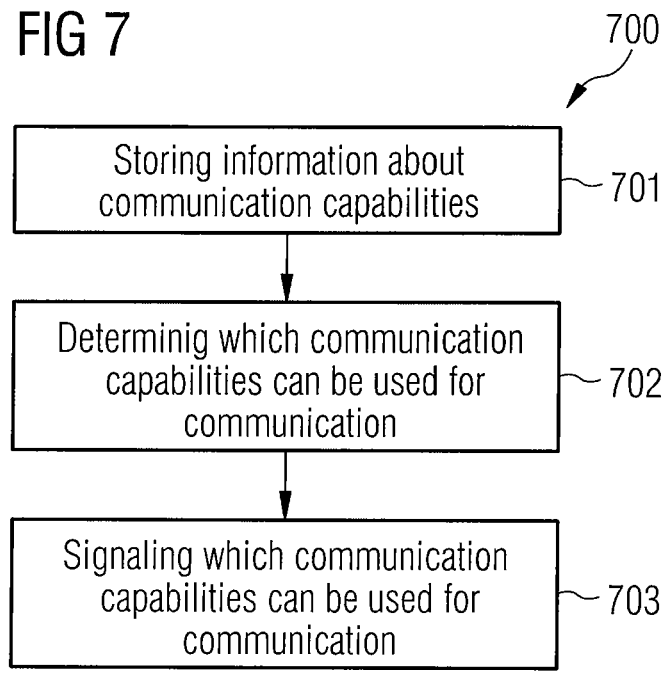
FIG. 7 shows a flow diagram according to an embodiment of the invention.

FIG. 7 shows a flow diagram 700 according to an embodiment of the invention.

In 701, for each communication terminal of a plurality of first communication terminals which are each associated with a same user identification, information about the communication capabilities of the respective communication terminals is stored.

In 702, it is determined which communication capabilities can be used for communicating with the user identified by the user identification based on the information about the communication capabilities of the first communication terminals.

In 703, it is signaled to a second communication terminal which communication capabilities can be used for communicating with the user identified by the user identification.

Figure 8:
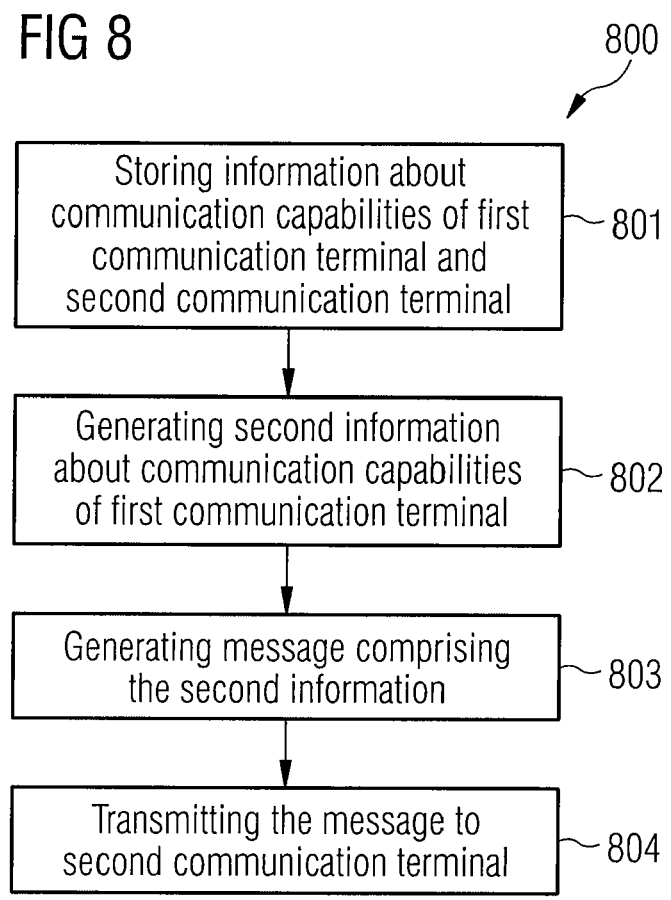
FIG. 8 shows a flow diagram according to an embodiment of the invention.

FIG. 8 shows a flow diagram 800 according to an embodiment of the invention.

In 801, first information about the communication capabilities of a first communication terminal and information about the communication capabilities of a second communication terminal are stored.

In 802, second information about the communication capabilities of the first communication terminal is generated using the first information about the communication capabilities of the first communication terminal and taking into account the information about the communication capabilities of the second communication terminal.

In 803, a message is generated comprising the second information about the communication capabilities of the first communication terminal.

In 804, the message is transmitted to the second communication terminal.

What is claimed is:

1. A communication network unit comprising:
a memory configured to store, for each communication terminal of a plurality of first communication terminals which are each associated with a same user identification, information about communication capabilities of the respective communication terminals;
a determining unit configured to determine which communication capabilities are available for communicating with a user by reading from the memory the information about the communication capabilities of the plurality of first communication terminals associated with the user identification of the user; and
a first signaling unit configured to transmit to a second communication terminal a data message that indicates which communication capabilities, as determined by the determining unit, are available for communicating with the user,
wherein a communication connection is established between a first communication terminal of the plurality of first communication terminals and the second communication terminal, and the determining unit is further configured to determine which communication capabilities of the first communication terminal can be used for communicating with the second communication terminal and to determine which of the communication capabilities of the other communication terminals of the plurality of first communication terminals can be used for communicating with the second communication terminal, and
wherein the first signaling unit is further configured to signal to the second communication terminal the communication capabilities of the first communication terminal that can be used for communicating with the second communication terminal as being available and to signal the communication capabilities of the other communication terminals of the plurality of first communication terminals that can be used for communicating with the second communication terminal as being conditionally available, and
a second signaling unit configured to notify communication terminals of the plurality of first communication terminals about the communication connection between the first communication terminal of the plurality of first communication terminals and the second communication terminal,
wherein the second signaling unit is further configured to notify communication terminals of the plurality of first communication terminals that have communication capabilities that can be used for communication with the second communication terminal, about the communication connection between the first communication terminal of the plurality of first communication terminals and the second communication terminal, and
wherein at least one of the communication terminals of the communication terminals that are being notified about the communication connection comprises a reporting unit configured to inform the user about the communication connection.

2. The communication network unit according to claim 1, wherein the plurality of first communication terminals signal their communication capabilities to the communication network unit.

3. The communication network unit according to claim 1, wherein the reporting unit is further configured to inform the user about communication capabilities of the at least one other communication terminal that can be used for communicating with the second communication terminal.

4. The communication network unit according to claim 1, wherein the first signaling unit is further configured to signal the communication capabilities using a call control protocol.

5. The communication network unit according to claim 1, wherein at least one of the communication terminals signaling information about its communication capabilities uses a call control protocol.

6. The communication network unit according to claim 5, wherein at least one of the communication terminals uses another protocol for sending and receiving control information, and the communication network further comprises a converting unit configured to convert messages according to the other protocol to the call control protocol and configured to convert messages according to the call control protocol to the other protocol.

7. The communication network unit according to claim 1, wherein the first signaling unit is further configured to signal the communication capabilities using the SIP protocol.

8. The communication network unit according to claim 1, wherein at least one of the communication terminals signals information about its communication capabilities using the SIP protocol.

9. The communication network unit according to claim 8, wherein at least one of the communication terminals uses another protocol for sending and receiving control information, and the communication network further comprises a converting unit configured to convert messages according to the other protocol to the SIP protocol and configured to convert messages according to the SIP protocol to the other protocol.

10. A method for exchanging communication capabilities, comprising:
storing, for each communication terminal of a plurality of first communication terminals which are each associated with a same user identification, information about communication capabilities of the respective communication terminals;
determining which communication capabilities are available for communicating with a user based on the stored information about the communication capabilities of the plurality of first communication terminals associated with the user identification of the user;

transmitting to a second communication terminal a data message that indicates which communication capabilities are available for communicating with the user as determined based on the user identification;

establishing a communication connection between a first communication terminal of the plurality of first communication terminals and the second communication terminal;

determining which communication capabilities of the plurality of first communication terminals are available for communicating with the second communication terminal;

signaling to the second communication terminal the communication capabilities of the plurality of first communication terminals that can be used for communicating with the second communication terminal as being available;

notifying communication terminals of the plurality of first communication terminals about the communication connection;

notifying communication terminals of the plurality of first communication terminals that have communication capabilities that can be used for communication with the second communication terminal about the communication connection; and informing the user about the communication connection on at least one of the communication terminals of the communication terminals that are being notified.

11. A communication network unit comprising:

a memory configured to store first information about the communication capabilities of a first communication terminal and to store information about the communication capabilities of a second communication terminal;

a processing unit configured to generate second information about the communication capabilities of the first communication terminal using the first information about the stored communication capabilities of the first communication terminal and taking into account the stored information about the communication capabilities of the second communication terminal;

a message generating unit configured to generate a message comprising the second information about the communication capabilities of the first communication terminal; a transmitting unit configured to transmit the message to the second communication terminal;

a connection unit configured to establish a communication connection between the first communication terminal and the second communication terminal;

a determining unit configured to determine which second information of the first communication terminal is available for communicating with the second communication terminal;

a signaling unit configured to signal to the second communication terminal the second information that can be used for communicating with the second communication terminal as being available;

a notifying unit configured to notify the first communication terminal about the communication connection and to notify communication terminal about the communication connection if mutual second information exists; and a reporting unit configured to inform a user about the communication connection.

12. The communication network unit according to claim 11, wherein the second information specifies communication capabilities of the first communication terminal that can be used by the second communication terminal for communicating with the first communication terminal.

13. The communication network unit according to claim 8, wherein the message is generated according to a call control protocol.

14. The communication network unit according to claim 13, wherein the message is generated according to the SIP protocol.

15. A method for exchanging capability information, comprising:

storing first information about the communication capabilities of a first communication terminal and storing information about the communication capabilities of a second communication terminal;

generating second information about the communication capabilities of the first communication terminal using the stored first information about the communication capabilities of the first communication terminal and taking into account the stored information about the communication capabilities of the second communication terminal;

generating a message comprising the second information about the communication capabilities of the first communication terminal; transmitting the message to the second communication terminal;

establishing a communication connection between the first communication terminal and the second communication terminal;

determining which second information about the communication capabilities of the first communication terminal are available for communicating with the second communication terminal;

signaling to the second communication terminal second information about the communication capabilities of the first communication terminal that can be used for communicating with the second communication terminal as being available;

notifying the first communication terminal about the communication connection;

notifying the first communication terminal that has second information about communication capabilities that can be used for communication with the second communication terminal about the communication connection; and informing a user about the communication connection on the first communication terminal.

16. The communication network unit according to claim 1, wherein the communication network is a home network and at least one of the plurality of first communication terminals is further configured to transmit the respective communication capabilities to a media router of the home network when the at least one of the plurality of first communication terminals is registered with the media router.

* * * * *